US012768399B2

(12) United States Patent
Liao et al.

(10) Patent No.: US 12,768,399 B2
(45) Date of Patent: Oct. 20, 2026

(54) LINEAR GUIDEWAY AND END MODULE THEREOF

(71) Applicant: OME TECHNOLOGY CO., LTD., Taoyuan City (TW)

(72) Inventors: Kuo-Fu Liao, Taoyuan City (TW); Jo-Hsuan Chang, Taoyuan City (TW); Wei-Min Wang, Taoyuan City (TW); Dai-De Lin, Taoyuan City (TW)

(73) Assignee: OME TECHNOLOGY CO., LTD., Taoyuan City (TW)

( * ) Notice: Subject to any disclaimer, the term of this patent is extended or adjusted under 35 U.S.C. 154(b) by 74 days.

(21) Appl. No.: 18/929,757

(22) Filed: Oct. 29, 2024

(65) Prior Publication Data

US 2026/0049636 A1 Feb. 19, 2026

(30) Foreign Application Priority Data

Aug. 19, 2024 (TW) ................................ 113208912

(51) Int. Cl.
*F16C 29/06* (2006.01)
*F16C 33/66* (2006.01)

(52) U.S. Cl.
CPC ...... *F16C 29/0609* (2013.01); *F16C 29/0645* (2013.01); *F16C 33/6655* (2013.01); *F16C 33/6659* (2013.01)

(58) Field of Classification Search
CPC .............. F16C 26/0609; F16C 26/0611; F16C 26/0635; F16C 26/0645; F16C 26/065
See application file for complete search history.

(56) References Cited

U.S. PATENT DOCUMENTS

| | | | | |
|---|---|---|---|---|
| 7,585,112 | B2 * | 9/2009 | Hsu | F16C 29/0609 384/45 |
| 9,677,610 | B2 * | 6/2017 | Chen | F16C 33/664 |
| 9,709,090 | B2 * | 7/2017 | Chen | F16C 29/0609 |
| 11,905,990 | B2 * | 2/2024 | Yu | F16C 33/6629 |
| 2005/0173195 | A1 * | 8/2005 | Anita | F16C 29/0609 184/5 |
| 2009/0196539 | A1 * | 8/2009 | Pfeuffer | F16C 33/6607 384/45 |

* cited by examiner

*Primary Examiner* — James Pilkington
(74) *Attorney, Agent, or Firm* — Li & Cai Intellectual Property (USA) Office

(57) ABSTRACT

A linear guideway and an end module thereof are provided. The end module includes a cap and a circulation sheet. The cap includes a transverse segment and two lateral segments that are respectively connected to two ends of the transverse segment. The circulation sheet is engaged in the transverse segment and the two lateral segments so as to jointly define an oil injection channel. The circulation sheet and the two lateral segments jointly define a plurality of turning channels. When a lubricating oil is injected into the oil injection channel of the end module, the circulation sheet absorbs a part of the lubricating oil and expands so as to be tightly fitted to the transverse segment and the two lateral segments of the cap.

10 Claims, 10 Drawing Sheets

LINEAR GUIDEWAY AND END MODULE THEREOF

CROSS-REFERENCE TO RELATED PATENT APPLICATION

This application claims the benefit of priority to Taiwan Patent Application No. 113208912, filed on Aug. 19, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a guideway, and more particularly to a linear guideway and an end module thereof.

BACKGROUND OF THE DISCLOSURE

A conventional linear guideway is configured to allow a plurality of rollers to be smoothly rollable therein by injecting lubricating oil into an end module thereof. Therefore, how to effectively seal the lubricating oil in the end module has always been one of important issues to be addressed in the relevant art.

SUMMARY OF THE DISCLOSURE

In response to the above-referenced technical inadequacies, the present disclosure provides a linear guideway and an end module thereof for effectively improving on the issues associated with conventional linear guideways.

In order to solve the above-mentioned problems, one of the technical aspects adopted by the present disclosure is to provide a linear guideway, which includes a rail, a sliding module, and two end modules. The rail has two lateral surfaces being opposite to each other. The sliding module is slidably disposed on the rail along a sliding direction and includes a slider and a plurality of rollers. The slider includes a base portion and two lateral portions that extend from the base portion. Inner sides of the two lateral portions respectively face toward the two lateral surfaces of the rail. The rollers correspond in position to the slider. The two end modules are respectively fixed to two assembling end surfaces of the slider and are slidably disposed on the rail. Each of the two end modules includes a cap and a circulation sheet. The cap is fixed to the corresponding assembling end surface and includes a transverse segment and two lateral segments that are respectively connected to two ends of the transverse segment. The transverse segment corresponds in position to the base portion, and two lateral segments respectively correspond in position to the two lateral portions. The circulation sheet is sandwiched between the cap and the corresponding assembling end surface. The circulation sheet is engaged in the transverse segment and the two lateral segments so as to jointly define an oil injection channel. The circulation sheet and the two lateral segments of the cap jointly define a plurality of turning channels. The turning channels are in cooperation with the slider and the rail to jointly define a plurality of rolling channels. The oil injection channel is in spatial communication with the rolling channels, and the rollers are rollably disposed in the rolling channels. In each of the two end modules, when a lubricating oil is injected into the oil injection channel, the circulation sheet expands through absorbing a part of the lubricating oil so as to be tightly fitted to the assembling end surface, the transverse segment, and the two lateral segments.

In order to solve the above-mentioned problems, another one of the technical aspects adopted by the present disclosure is to provide an end module of a linear guideway, which includes a cap and a circulation sheet. The cap includes a transverse segment and two lateral segments that are respectively connected to two ends of the transverse segment. The circulation sheet is engaged in the transverse segment and the two lateral segments so as to jointly define an oil injection channel. The circulation sheet and the two lateral segments of the cap jointly define a plurality of turning channels. When a lubricating oil is injected into the oil injection channel of the end module, the circulation sheet expands by absorbing a part of the lubricating oil so as to be tightly fitted to the transverse segment and the two lateral segments of the cap.

Therefore, any one of the linear guideway and the end module provided by the present disclosure can effectively seal the lubricating oil therein through the structural cooperation of the cap and the circulation sheet (e.g., the circulation sheet being engaged in and tightly fitted to the cap), thereby maintaining the predetermined amount of the lubricating oil in the linear guideway.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
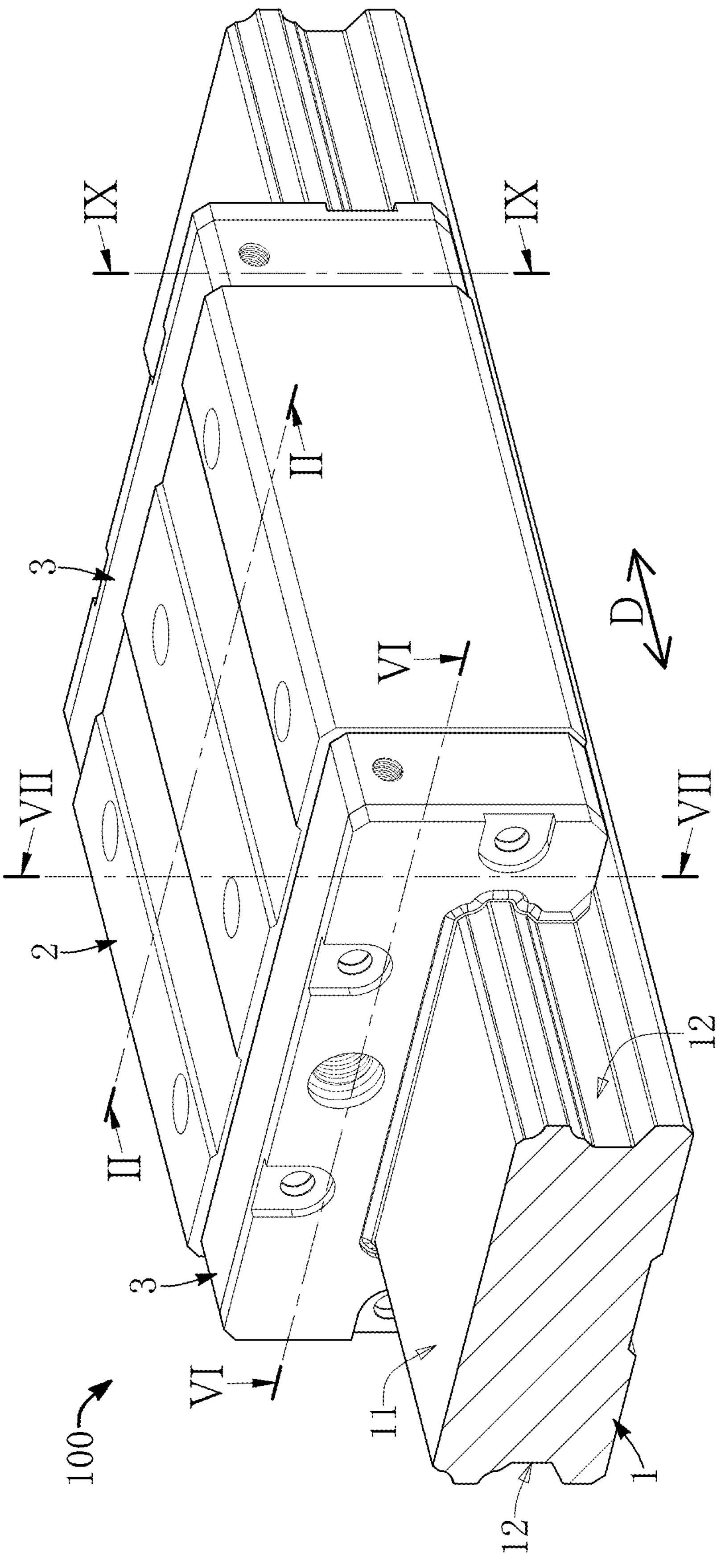
FIG. 1 is a schematic perspective view of a linear guideway according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 2:
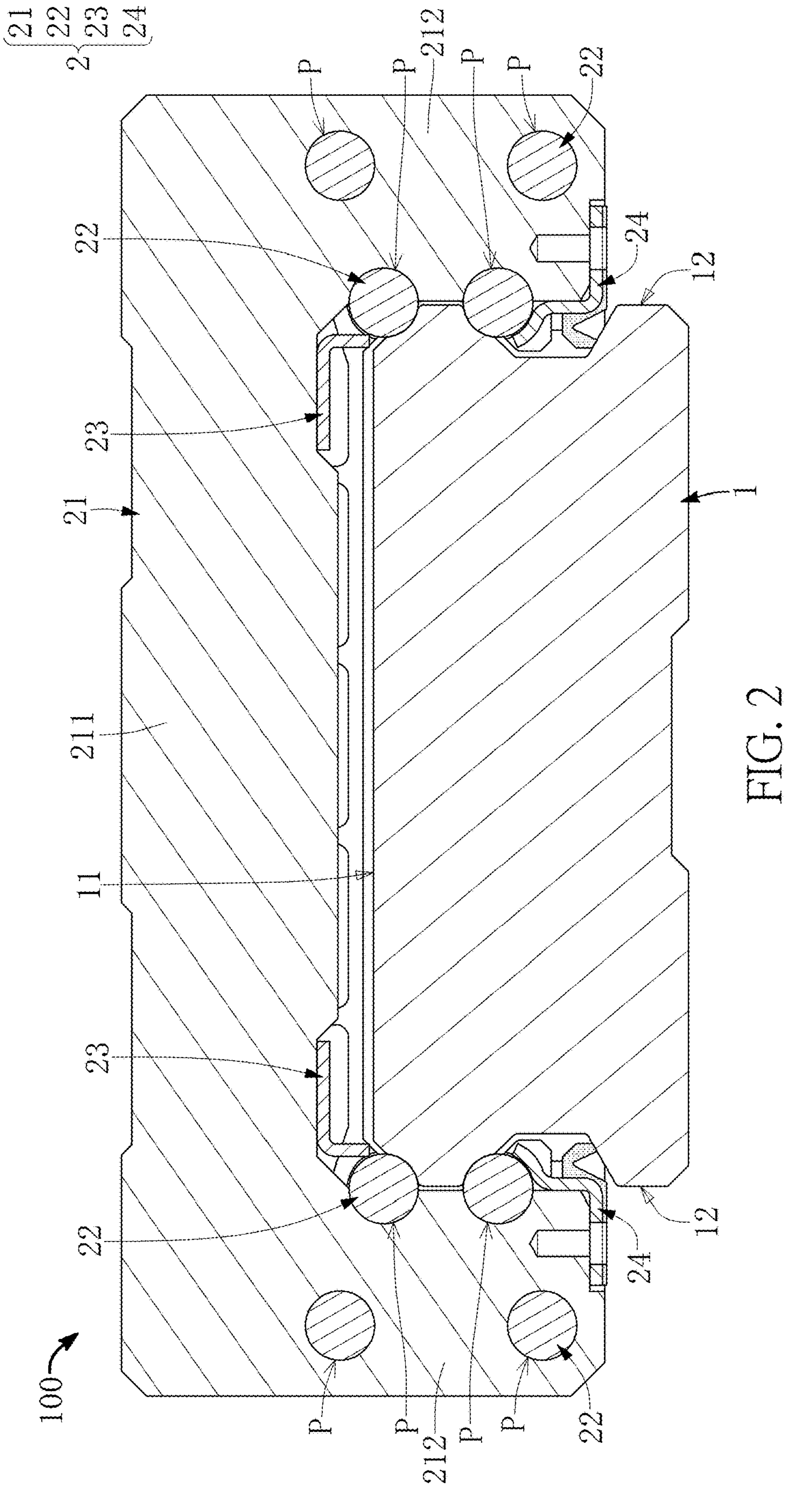
FIG. 2 is a schematic cross-sectional view taken along line II-II of FIG. 1.
Figure 3:
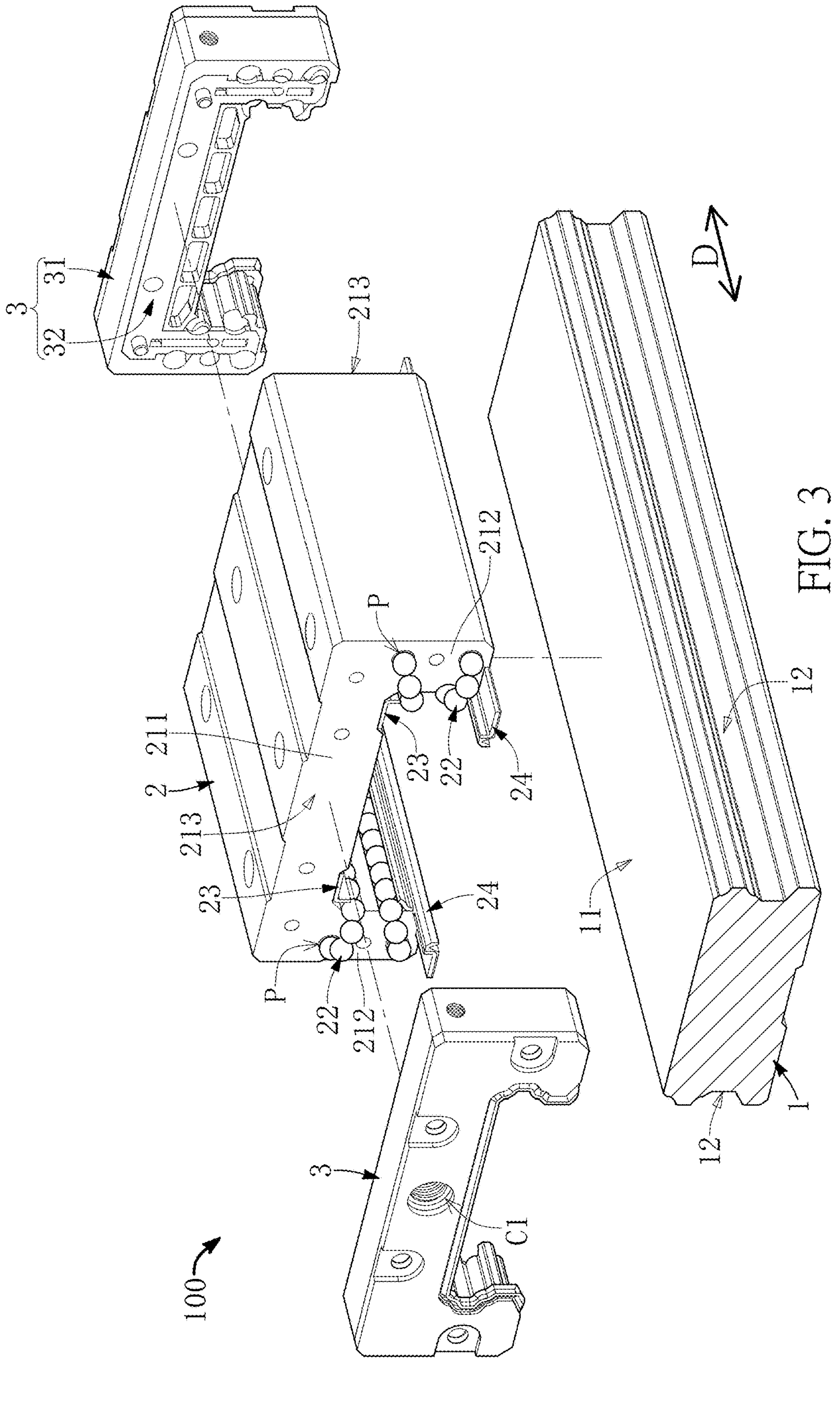
FIG. 3 is a schematic exploded view of FIG. 1.
Figure 4:
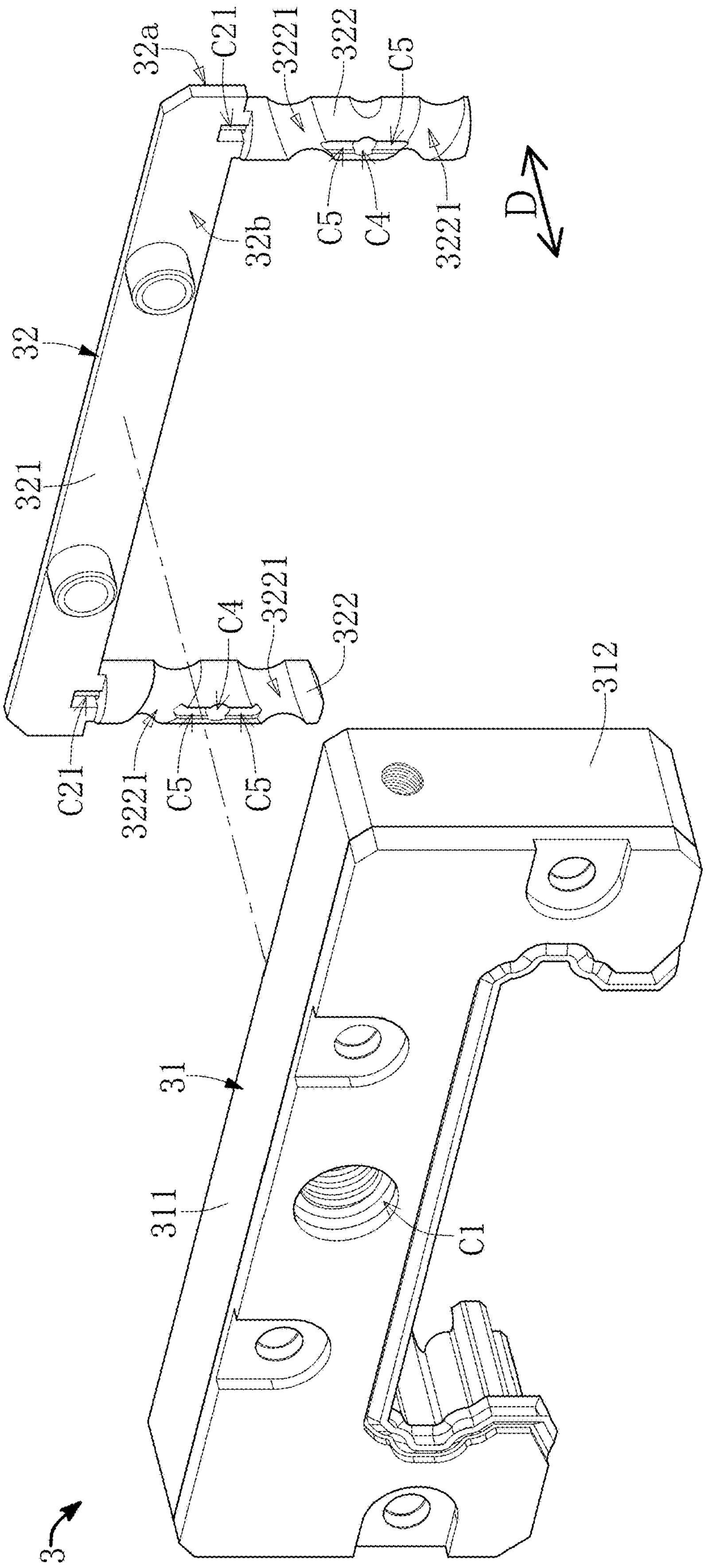
FIG. 4 is a schematic exploded view of an end module according to the embodiment of the present disclosure.
Figure 5:
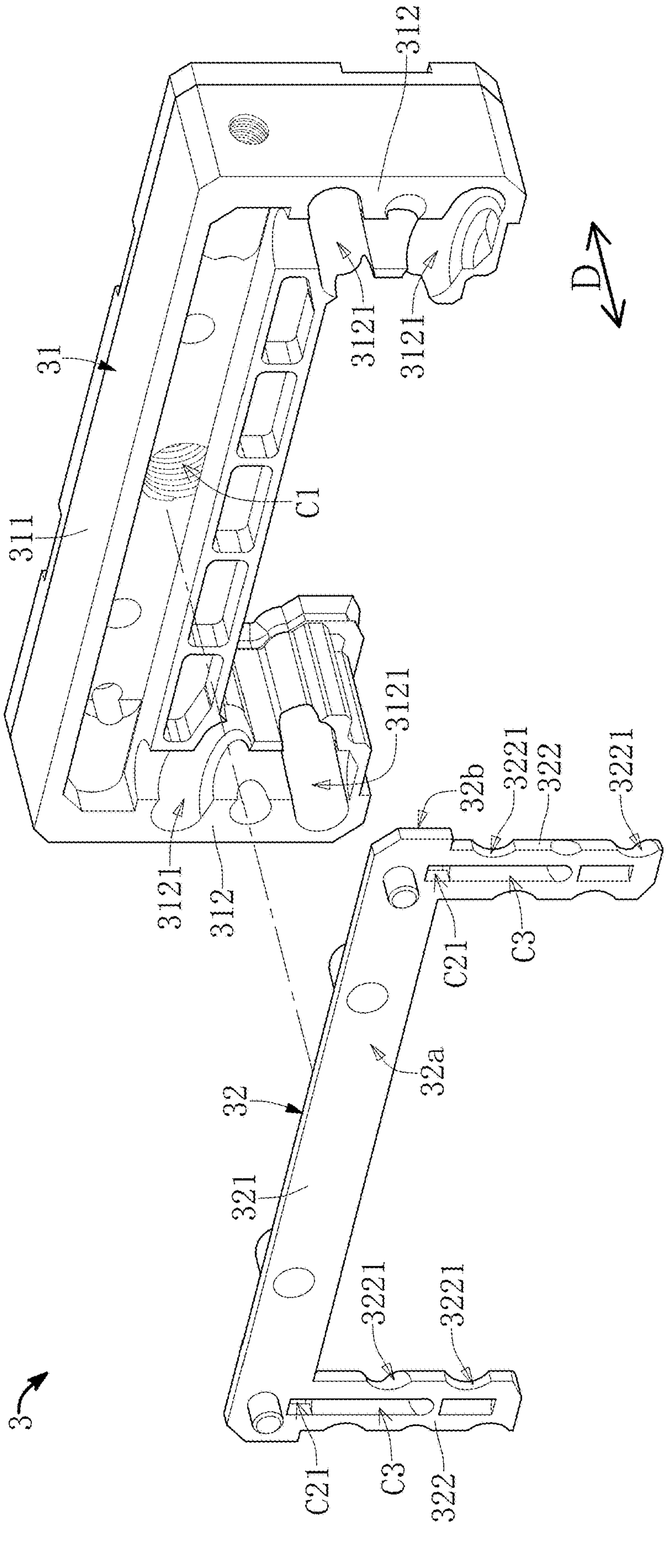
FIG. 5 is a schematic exploded view of the end module from another angle of view according to the embodiment of the present disclosure.
Figure 6:
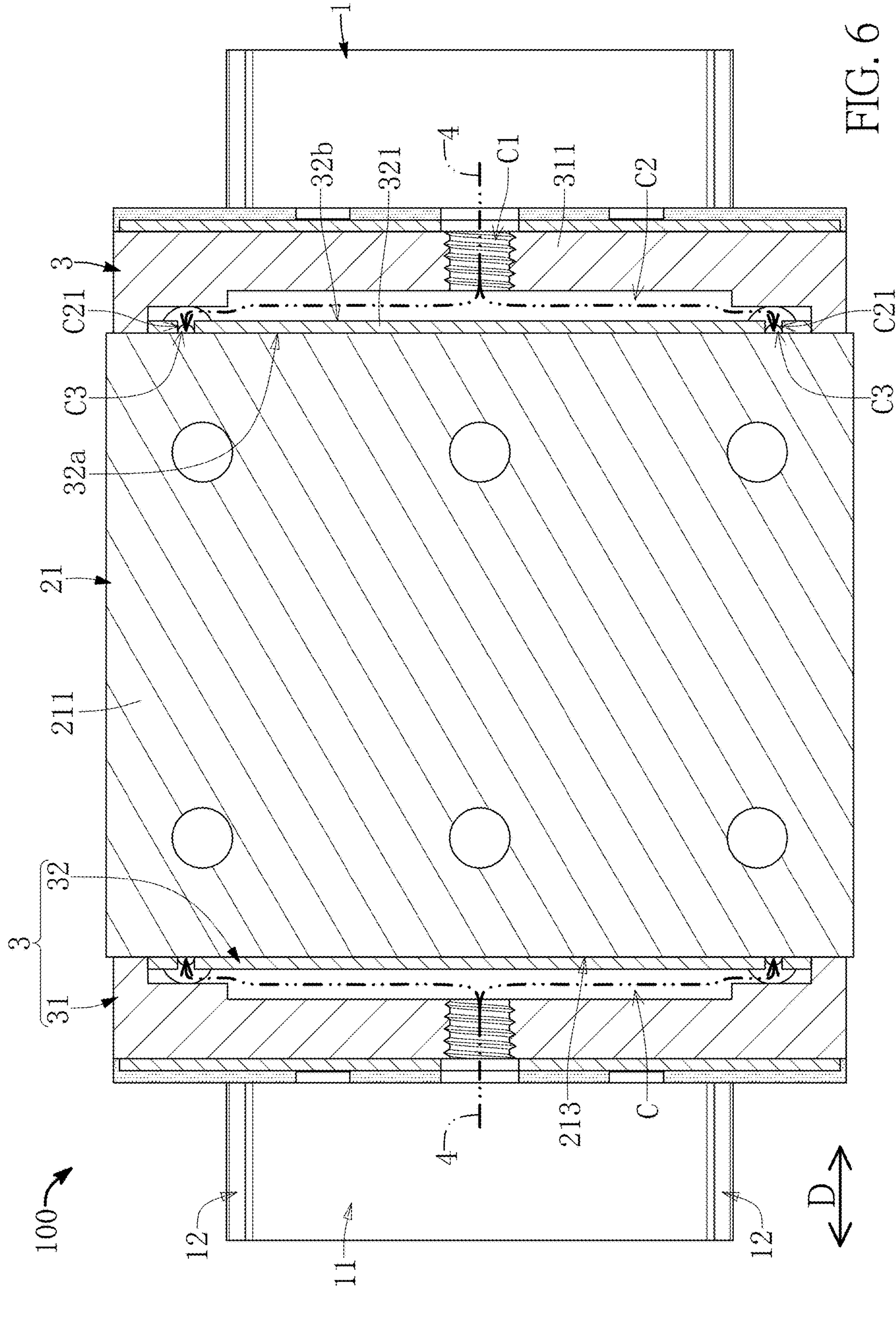
FIG. 6 is a schematic cross-sectional view taken along line VI-VI of FIG. 1.
Figure 7:
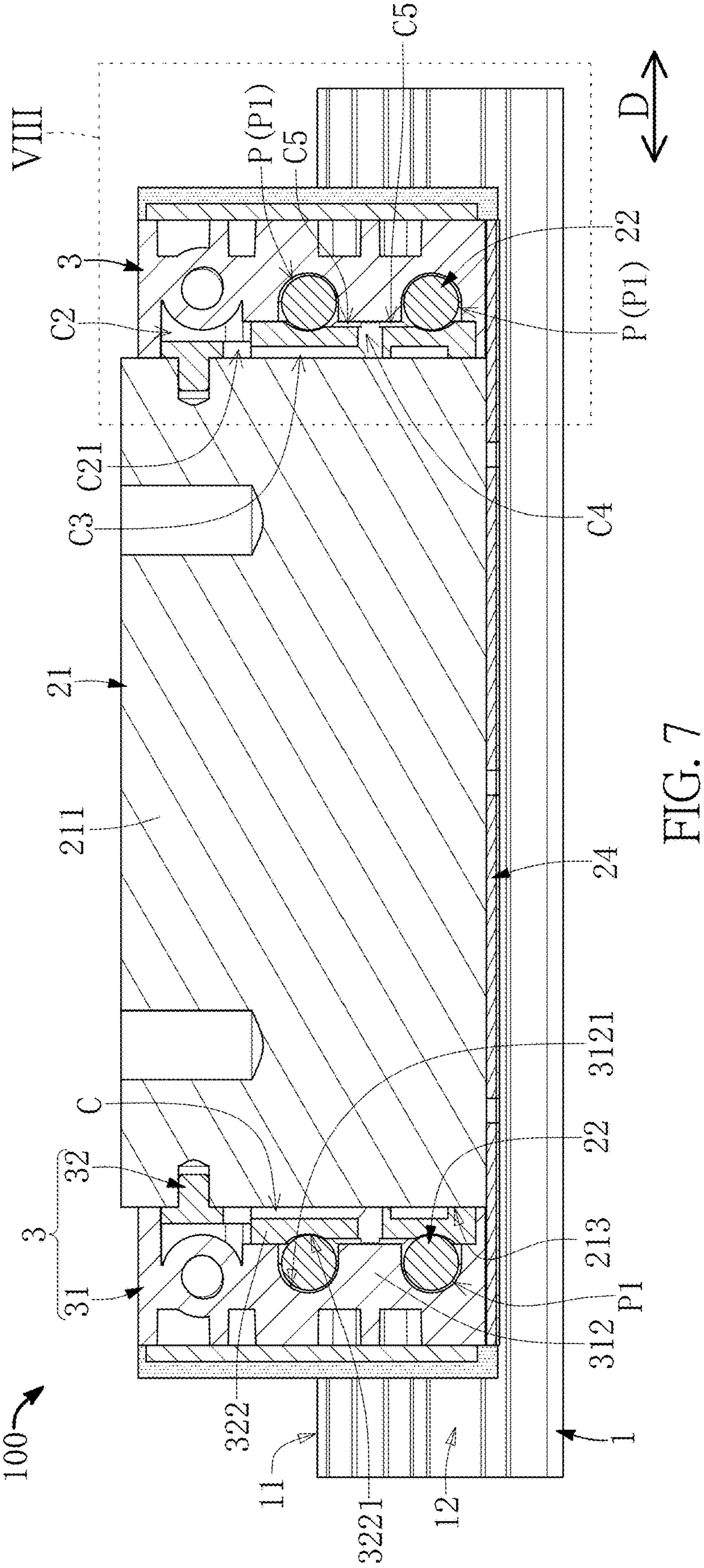
FIG. 7 is a schematic cross-sectional view taken along line VII-VII of FIG. 1.
Figure 8:
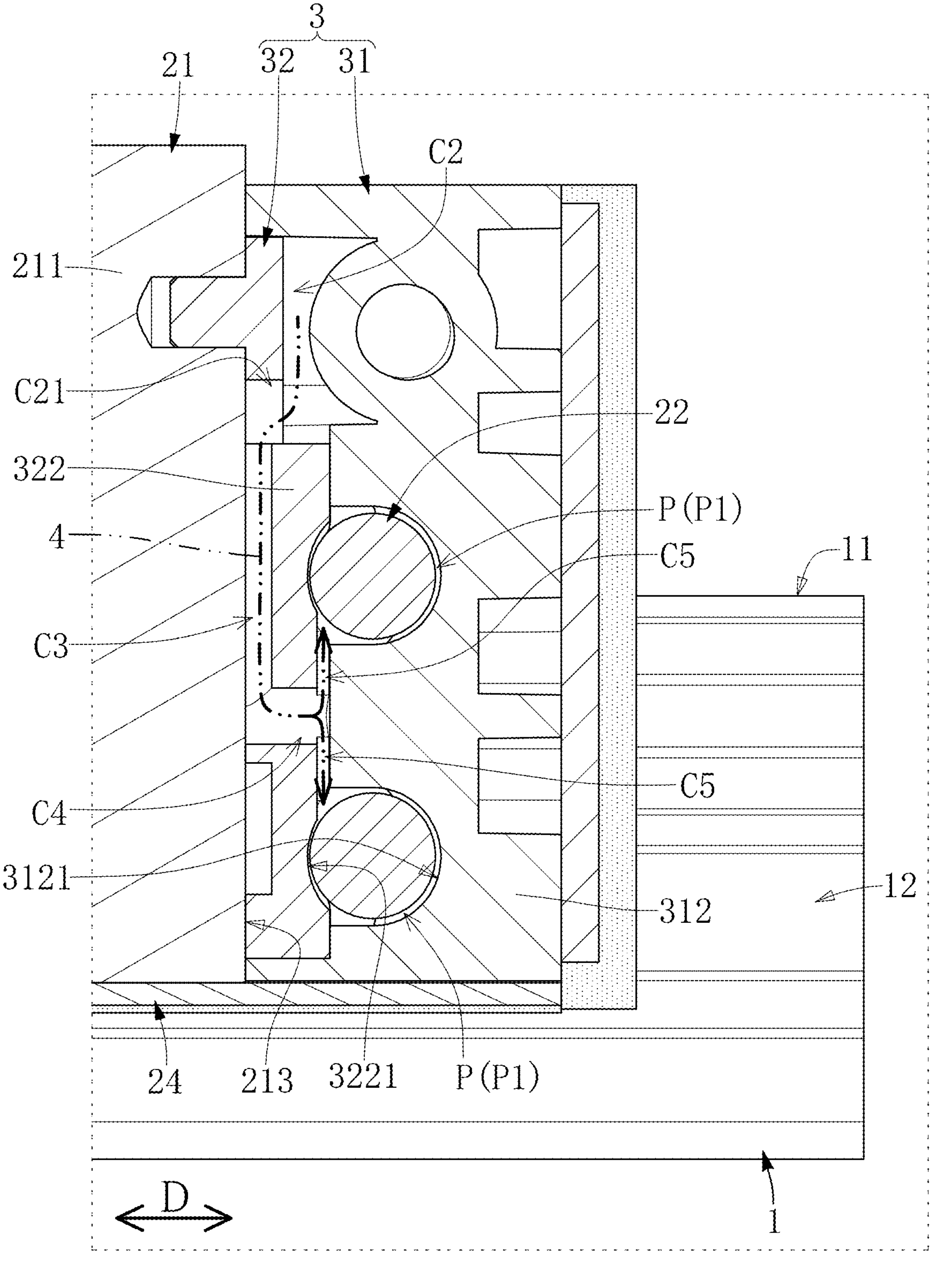
FIG. 8 is a schematic enlarged view of part VIII of FIG. 7.
Figure 9:
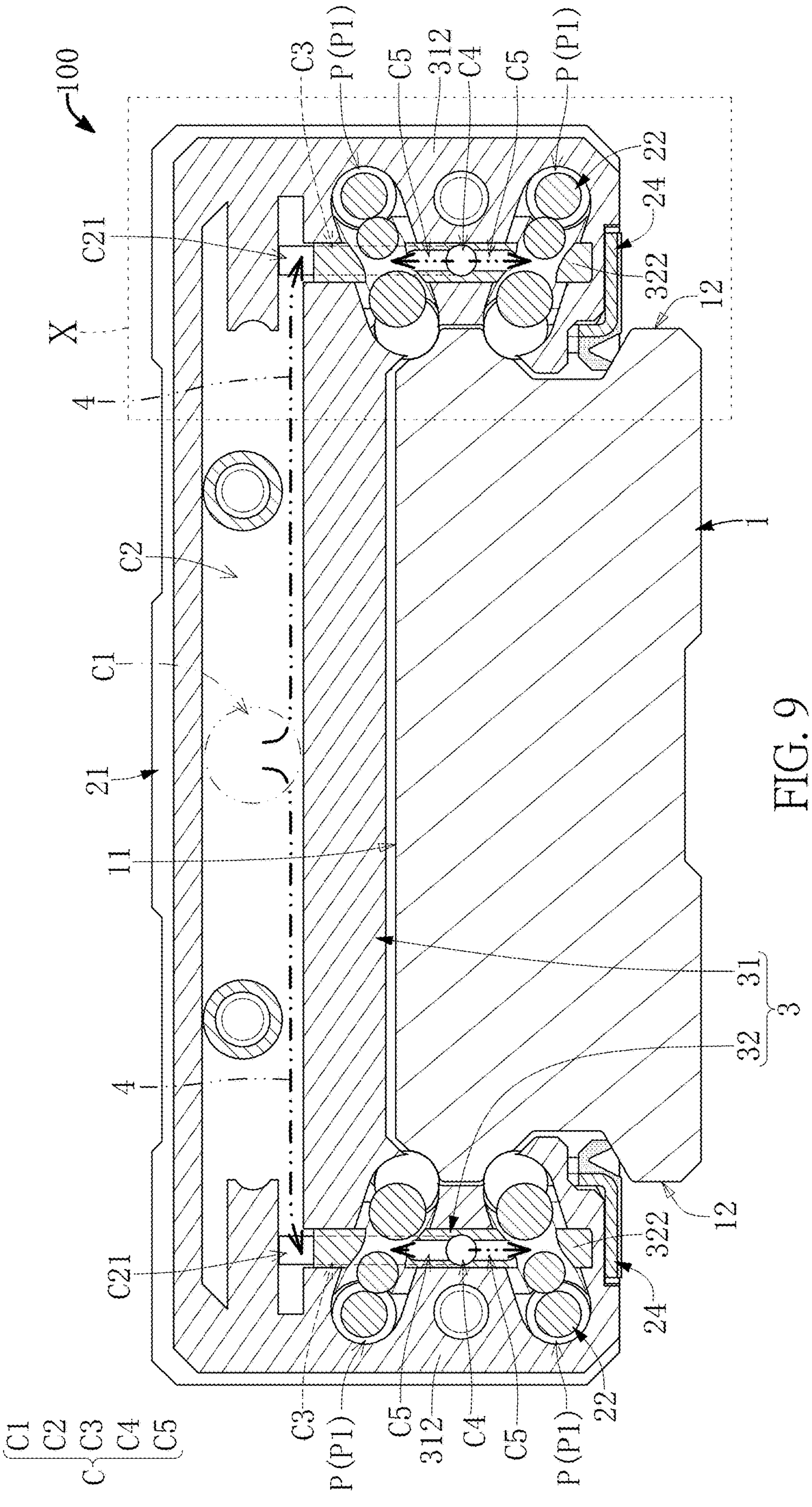
FIG. 9 is a schematic cross-sectional view taken along line IX-IX of FIG. 1.
Figure 10:
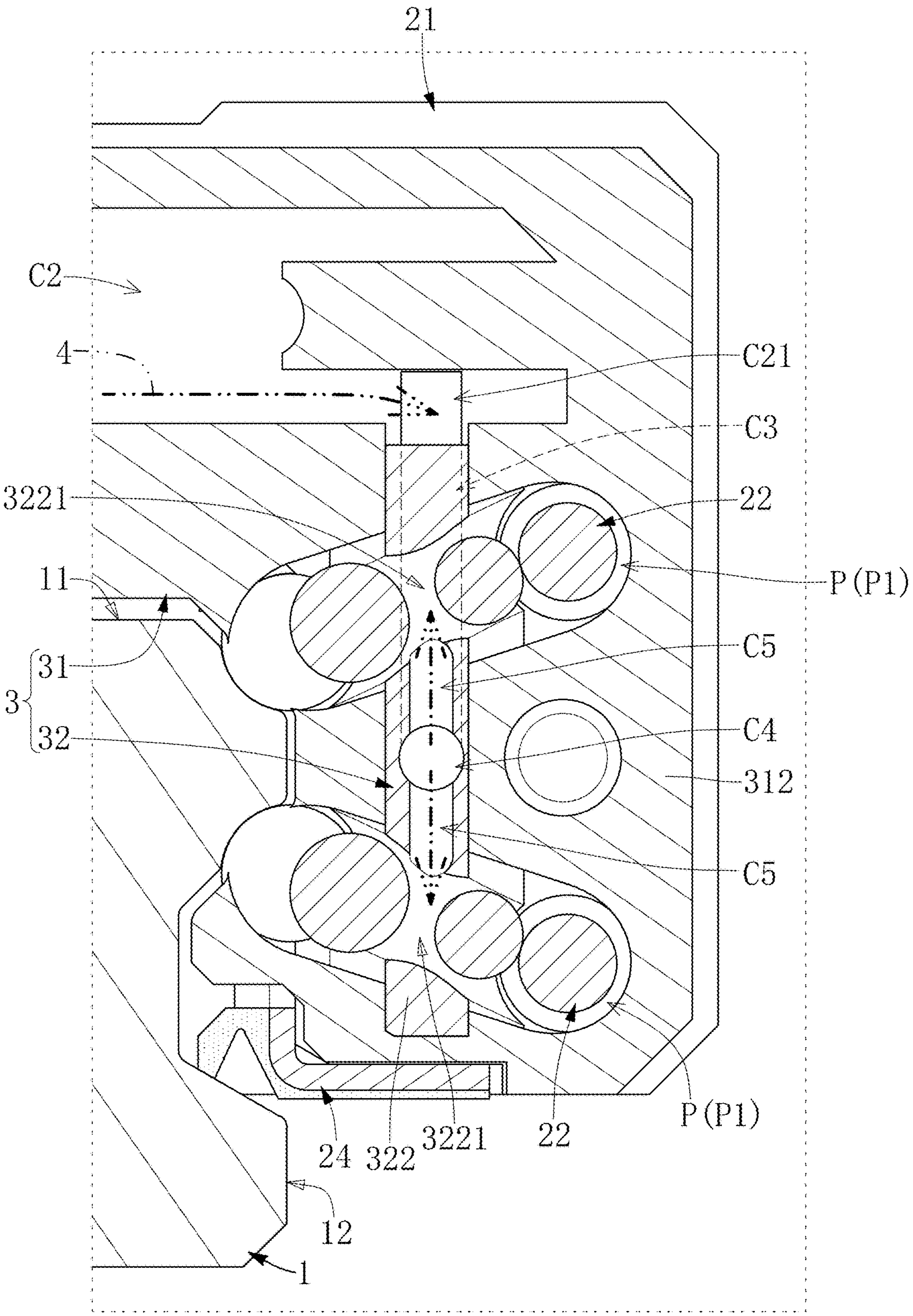
FIG. 10 is a schematic enlarged view of part X of FIG. 9.

Referring to FIG. 1 to FIG. 10, an embodiment of the present disclosure provides a linear guideway 100. The linear guideway 100 in the following description is, for example, a miniature linear guideway, but the present disclosure is not limited thereto. As shown in FIG. 1 to FIG. 3, the linear guideway 100 of the present embodiment includes a rail 1 being elongated, a sliding module 2 slidably disposed on the rail 1 along a sliding direction D, and two end modules 3 that are respectively assembled to two opposite ends of the sliding module 2 and that are slidably disposed on the rail 1. The rail 1, the sliding module 2, and the two end modules 4 jointly define a plurality of rolling channels P.

It should be noted that the two end modules 3 of the linear guideway 100 in the present embodiment are described in cooperation with the rail 1 and the sliding module 2, but the present disclosure is not limited thereto. For example, in other embodiments of the present disclosure not shown in the drawings, the end module 3 can be independently used (e.g., sold) or can be used in cooperation with other components.

A longitudinal direction of the rail 1 defines the sliding direction D, and the rail 1 has an upper surface 11 and two lateral surfaces 12 that are opposite to each other. In the present embodiment, the rail 1 has a straight-like shape, the two lateral surfaces 12 are respectively connected to two opposite edges of the upper surface 11, and the upper surface 11 and the two lateral surfaces 12 are parallel to the sliding direction D, but the present disclosure is not limited thereto. For example, in other embodiments of the present disclosure not shown in the drawings, the rail 1 can be a curved structure according to practical requirements.

The sliding module 2 in the present embodiment includes a slider 21, a plurality of rollers 22 corresponding in position to the slider 21, a plurality of upper dust-proof strips 23 assembled to the slider 21, and a plurality of lower dust-proof strips 24 that are assembled to the slider 21. The slider 21 in the present embodiment is elongated, and the sliding direction D can be defined by a longitudinal direction of the slider 21. The slider 21 includes a base portion 211 and two lateral portions 212 that extend from the base portion 211, and two assembling end surfaces 213 of the slider 21 are perpendicular to the sliding direction D. Moreover, an inner side of the base portion 211 faces toward the upper surface 11 of the rail 1, and inner sides of the two lateral portions 212 respectively face toward the two lateral surfaces 12 of the rail 1.

Furthermore, the rollers 22 are rollably disposed in the rolling channels P, and the rollers 22 in the present embodiment are rolling balls, but the present disclosure is not limited thereto. In addition, the upper dust-proof strips 23 are fixed to the base portion 211 and abuts against the upper surface 11 of the rail 1, and the lower dust-proof strips 24 are respectively fixed to the two lateral portions 212 and respectively abut against the two lateral surfaces 12 of the rail 1.

The two end modules 3 are respectively fixed to the two assembling end surfaces 213 of the slider 21, and are slidably disposed on the rail 1. It should be noted that as the two end modules 3 in the present embodiment are of substantially the same structure or are mirror-symmetrical with respect to the rail 1, the following description discloses the structure of just one of the two end modules 3 for the sake of brevity, but the present disclosure is not limited thereto. For example, in other embodiments of the present disclosure not shown in the drawings, the two end modules 3 can be of different structures.

As shown in FIG. 4 to FIG. 10 of the present embodiment, the end module 3 includes a cap 31 and a circulation sheet 32 that is assembled to the cap 31. The cap 31 is fixed to the corresponding assembling end surface 213, and the circulation sheet 32 is sandwiched between the cap 31 and the corresponding assembling end surface 213. The cap 31 can be formed by combining multiple pieces, and the circulation sheet 32 is integrally formed as a single one-piece structure, but the present disclosure is not limited thereto.

Specifically, the cap 31 includes a transverse segment 311 and two lateral segments 312 that are respectively connected to two ends of the transverse segment 311. In the present embodiment, the cap 31 has a substantial U-shape, the transverse segment 311 is perpendicularly connected to each of the two lateral segments 312 and corresponds in position to (or abuts against) the base portion 211, and the two lateral segments 312 respectively correspond in position to (or abut against) the two lateral portions 212.

The circulation sheet 32 is engaged in the transverse segment 311 and the two lateral segments 312 so as to jointly define an oil injection channel C. Moreover, the circulation sheet 32 and the two lateral segments 312 of the cap 31 jointly define a plurality of turning channels P1. The turning channels P1 are in cooperation with the slider 21 and the rail 1 to jointly define a plurality of rolling channels P, and the oil injection channel C is in spatial communication with the rolling channels P (or the turning channels P1).

Specifically, when a lubricating oil 4 is injected into the oil injection channel C of each of the two end modules 3, the circulation sheet 32 expands by absorbing a part of the lubricating oil 4 so as to be tightly fitted to the assembling end surface 213, the transverse segment 311 of the cap 31, and the two lateral segments 312 of the cap 31. Accordingly, the linear guideway 100 can effectively seal the lubricating oil 4 therein through the structural cooperation of the cap 31 and the circulation sheet 32 in each of the two end modules 3 (e.g., the circulation sheet 32 being engaged in and tightly fitted to the cap 31), thereby maintaining the predetermined amount of the lubricating oil 4 in the linear guideway 100.

It should be noted that the linear guideway 100 can further include the lubricating oil 4 according to practical requirements; in other words, the lubricating oil 4 can be regarded as a part of the linear guideway 100. Moreover, in order to enable the lubricating oil 4 to be more uniformly distributed in the rolling channels P (or the turning channels P1) through the end module 3, the end module 3 preferably has at least part of the features described below, but the present disclosure is not limited thereto.

The following description is provided in the context of the structure of the turning channels P1. Each of the lateral segments 312 has two outer arced surfaces 3121 that respectively correspond in position to the two turning channels P1 and that are spaced apart from each other. The circulation sheet 32 includes an oil sealing segment 321 and two turning segments 322 that are respectively connected to two ends of the oil sealing segment 321. The two turning segments 322 are in a mirror-symmetrical arrangement with respect to the oil sealing segment 321.

Moreover, the oil sealing segment 321 is engaged in the transverse segment 311, and the two turning segments 322 are respectively engaged in the two lateral segments 312. Each of the two turning segments 322 has two inner arced surfaces 3221 that are spaced apart from each other and that respectively face toward the two outer arced surfaces 3121 of the corresponding lateral segment 312, so as to jointly define two of the turning channels P1.

The following description is provided in the context of the structure of the oil injection channel C. The circulation sheet 32 has a rear surface 32*a* abutting against the corresponding assembling end surface 312 (or being arranged away from the oil injection hole C1) and a front surface 32*b* that is opposite to the rear surface 32*a*. In other words, the front surface 32*b* of the circulation sheet 32 is located in a space surroundingly defined by the cap 31.

The oil injection channel C includes an oil injection hole C1 and a first diversion slot C2 that is in spatial communication with the oil injection hole C1. The oil injection hole C1 is formed in the transverse segment 311, and the oil injection hole C1 in the present embodiment is arranged on a substantial center portion of the transverse segment 311. The first diversion slot C2 is formed in-between the transverse segment 311 and the oil sealing segment 321, and the first diversion slot C2 in the present embodiment has two diversion openings C21 respectively arranged on two ends thereof.

Moreover, through the tight-fitting of the transverse segment 311 and the oil sealing segment 321, the lubricating oil 4 in the end module 3 flows into or out of the first diversion slot C2 only by passing through the oil injection hole C1 and the two diversion openings C21. In the present embodiment, the two diversion openings C21 of the first diversion slot C2 are respectively in spatial communication with the two turning segments 322, so that the first diversion slot C2 can be in spatial communication with the rolling channels P (or the turning channels P1) through the two turning segment 322.

Specifically, the oil injection channel C in each of the two turning segments 322 includes a guiding slot C3 in spatial communication with one end of the first diversion slot C2 (e.g., one of the two diversion openings C21), a penetrating slot C4 in spatial communication with the guiding slot C3, and two second diversion slots C5 that are in spatial communication with the penetrating slot C4. The guiding slot C3 is recessed in the rear surface 32*a* of the turning segment 322, the penetrating slot C4 is recessed from the rear surface 32*a* to penetrate the front surface 32*b* and is arranged between the two inner arced surfaces 3221, and the two second diversion slots C5 are recessed in the front surface 32*b* of the turning segment 322 and extend from the penetrating slot C4 to the two turning channels P1. For example, parts of the two second diversion slots C5 are respectively recessed in the inner arced surfaces 3221.

In summary, the end module 3 in the present embodiment is provided with the cooperation of the guiding slot C3 and the penetrating slot C4, so that the lubricating oil 4 does not flow directly to any adjacent one of the turning channels P1 from the first diversion slot C2, thereby preventing the lubricating oil 4 in the turning channels P1 from being non-uniformly distributed. Accordingly, the lubricating oil 4 can be more uniformly distributed in the rolling channels P through the end module 3.

Beneficial Effects of the Embodiment

In conclusion, any one of the linear guideway and the end module provided by the present disclosure can effectively seal the lubricating oil therein through the structural cooperation of the cap and the circulation sheet (e.g., the circulation sheet being engaged in and tightly fitted to the cap), thereby maintaining the predetermined amount of the lubricating oil in the linear guideway.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A linear guideway, comprising:

a rail having two lateral surfaces being opposite to each other;

a sliding module slidably disposed on the rail along a sliding direction and including:

a slider including a base portion and two lateral portions that extend from the base portion, wherein inner sides of the two lateral portions face toward the two lateral surfaces of the rail, respectively; and a plurality of rollers disposed on the slider and the rail; and two end modules respectively fixed to two assembling end surfaces of the slider and being slidably disposed on the rail, wherein each of the two end modules includes:

a cap fixed to the corresponding assembling end surface and including a transverse segment and two lateral segments that are respectively connected to two ends of the transverse segment, wherein the transverse segment corresponds in position to the base portion, and two lateral segments respectively correspond in position to the two lateral portions; and a circulation sheet being oil-swollen and sandwiched between the cap and the corresponding assembling end surface, wherein the circulation sheet is engaged in the transverse segment and the two lateral segments so as to jointly define an oil injection channel;

wherein the circulation sheet and the two lateral segments of the cap jointly define a plurality of turning channels, wherein the turning channels are in cooperation with the slider and the rail to jointly define a plurality of rolling channels, and wherein the oil injection channel is in spatial communication with the rolling channels, and the rollers are rollably disposed in the rolling channels;

wherein, in each of the two end modules, when a lubricating oil is injected into the oil injection channel, the circulation sheet absorbs a part of a total volume of the lubricating oil and expands so as to be fitted to the assembling end surface, the transverse segment, and the two lateral segments.

2. The linear guideway according to claim 1, wherein, in each of the two end modules, each of the two lateral segments has two outer arced surfaces that are spaced apart from each other, and the circulation sheet includes:

an oil sealing segment engaged in the transverse segment; and two turning segments respectively connected to two ends of the oil sealing segment and respectively engaged in the two lateral segments, wherein each of the two turning segments has two inner arced surfaces that are spaced apart from each other and that respectively face toward the two outer arced surfaces of the corresponding lateral segment, so as to jointly define two of the turning channels.

3. The linear guideway according to claim 2, wherein, in each of the two end modules, the oil injection channel includes:

an oil injection hole formed in the transverse segment; and a first diversion slot formed in-between the transverse segment and the oil sealing segment and being in spatial communication with the oil injection hole;

wherein the first diversion slot is spatially communicated with the rolling channels by being in spatial communication with the two turning segments.

4. The linear guideway according to claim 3, wherein, in each of the two end modules, the circulation sheet has a rear surface abutting against the corresponding assembling end surface and a front surface that is opposite to the rear surface, and the oil injection channel in each of the two turning segments includes:

a guiding slot recessed in the rear surface and being in spatial communication with one end of the first diversion slot;

a penetrating slot penetrating through from the rear surface to the front surface and arranged between the two inner arced surfaces, wherein the penetrating slot is in spatial communication with the guiding slot; and two second diversion slots recessed in the front surface and extending from the penetrating slot to the two turning channels.

5. The linear guideway according to claim 4, wherein, in each of the turning segments, parts of the two second diversion slots are respectively recessed in the inner arced surfaces.

6. The linear guideway according to claim 2, wherein, in each of the two end modules, the circulation sheet is integrally formed as a single one-piece structure, and the two turning segments are in a mirror-symmetrical arrangement with respect to the oil sealing segment.

7. An end module of a linear guideway, comprising:

a cap including a transverse segment and two lateral segments that are respectively connected to two ends of the transverse segment; and a circulation sheet being oil-swollen, wherein the circulation sheet is engaged in the transverse segment and the two lateral segments so as to jointly define an oil injection channel, wherein the circulation sheet and the two lateral segments of the cap jointly define a plurality of turning channels, wherein, when a lubricating oil is injected into the oil injection channel of the end module, the circulation sheet absorbs a part of a total volume of the lubricating oil and expands so as to be fitted to the transverse segment and the two lateral segments of the cap.

8. The end module according to claim 7, wherein each of the two lateral segments has two outer arced surfaces that are spaced apart from each other, and the circulation sheet includes:

an oil sealing segment engaged in the transverse segment; and two turning segments respectively connected to two ends of the oil sealing segment and respectively engaged in the two lateral segments, wherein each of the two turning segments has two inner arced surfaces that are spaced apart from each other and that respectively face toward the two outer arced surfaces of a corresponding one of the lateral segments so as to jointly define two of the turning channels.

9. The end module according to claim 8, wherein the oil injection channel includes:

an oil injection hole formed in the transverse segment; and a first diversion slot formed in-between the transverse segment and the oil sealing segment and being in spatial communication with the oil injection hole;

wherein the first diversion slot is spatially communicated with the rolling channels by being in spatial communication with the two turning segments.

10. The end module according to claim 9, wherein the circulation sheet has a rear surface arranged away from the oil injection hole and a front surface that is opposite to the rear surface, and the oil injection channel in each of the two turning segments includes:

a guiding slot recessed in the rear surface and being in spatial communication with one end of the first diversion slot;

a penetrating slot penetrating through from the rear surface to the front surface and arranged between the two inner arced surfaces, wherein the penetrating slot is in spatial communication with the guiding slot; and two second diversion slots recessed in the front surface and extending from the penetrating slot to the two turning channels.

* * * * *